United States Patent Office 2,790,306
Patented Apr. 30, 1957

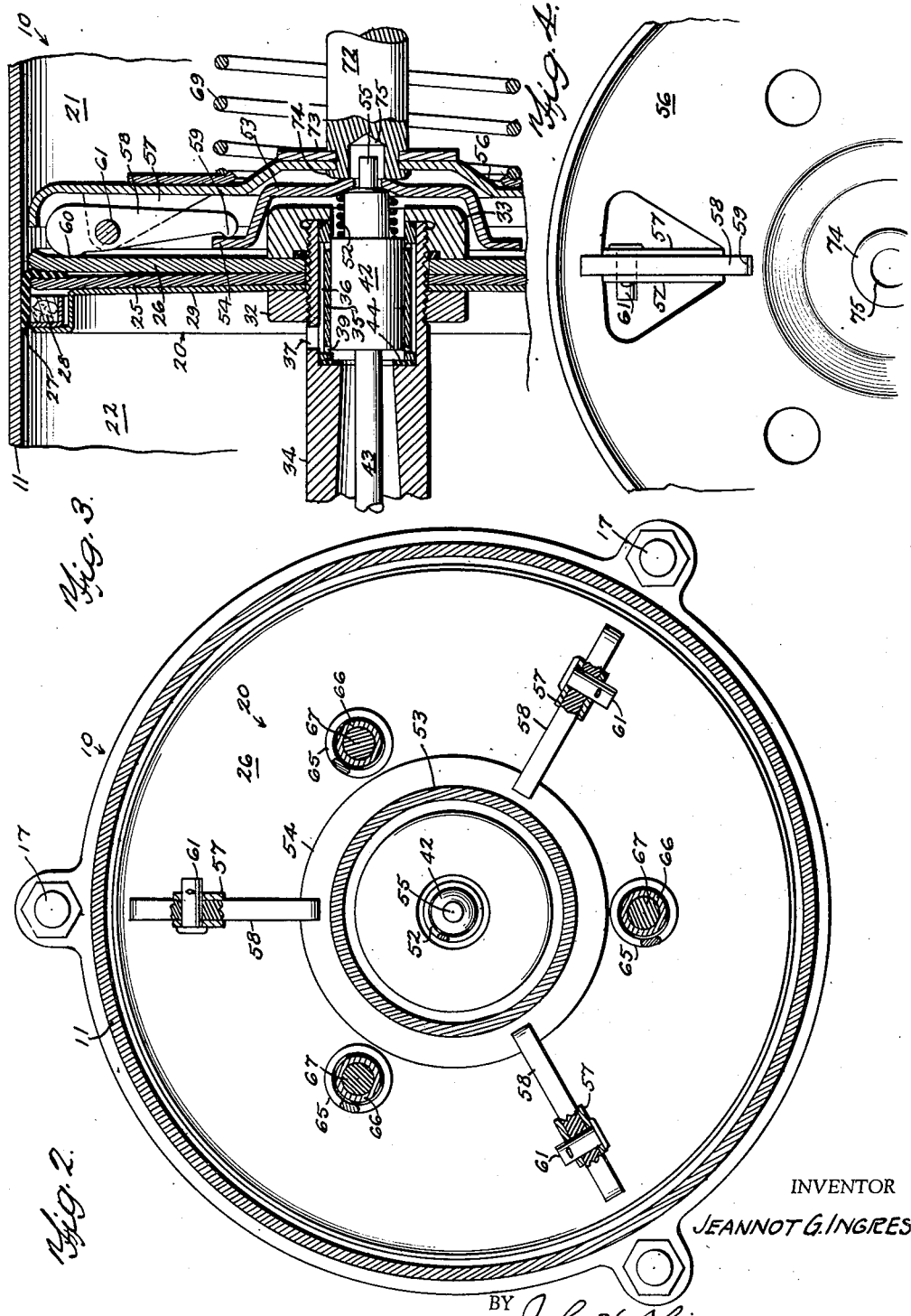

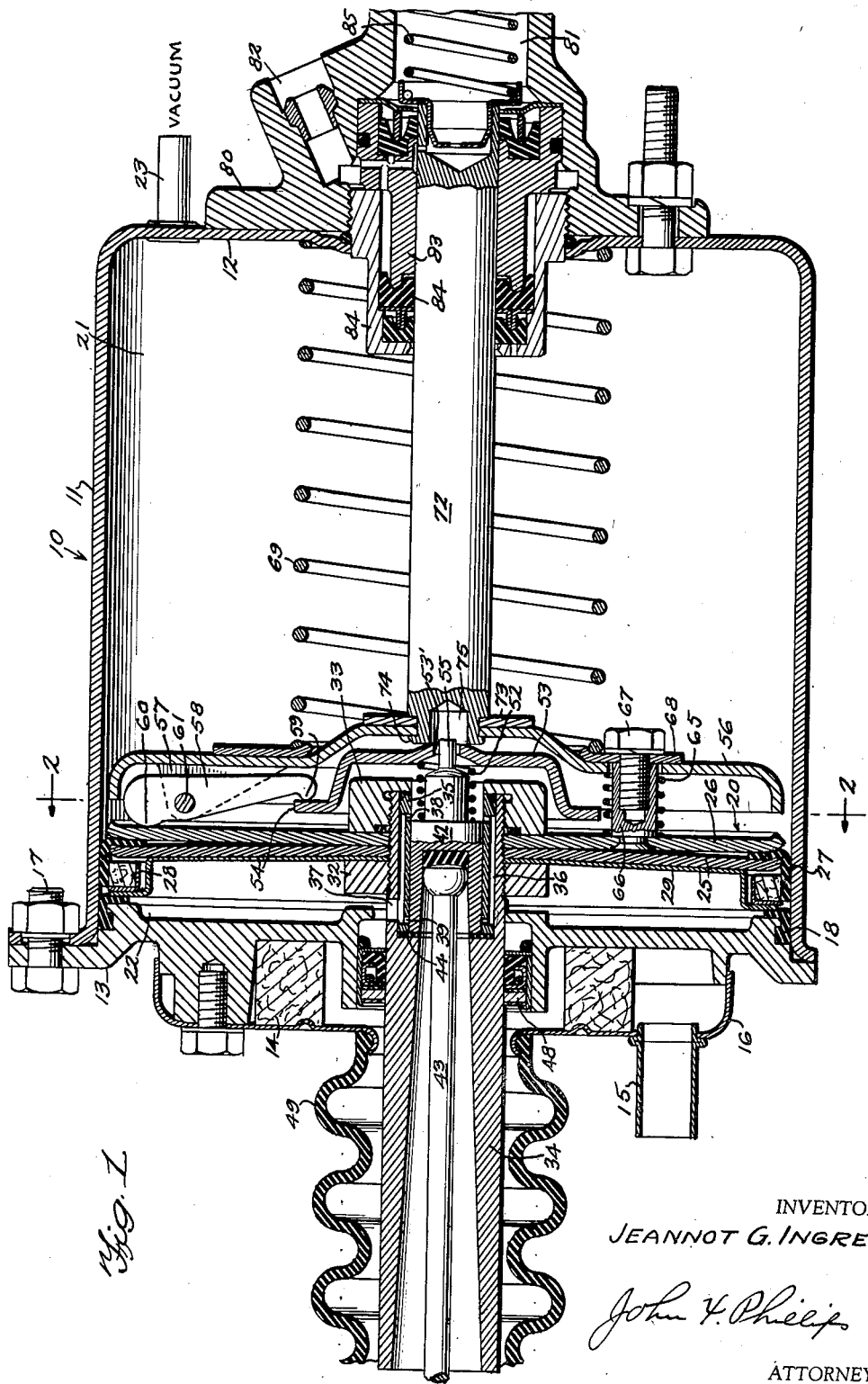

2,790,306

BOOSTER BRAKE MECHANISM

Jeannot G. Ingres, Dearborn, Mich., assignor to Kelsey-Hayes Company, a corporation of Delaware Application June 26, 1953, Serial No. 364,346

16 Claims. (Cl. 60—54.6)

This invention relates to a booster brake mechanism for motor vehicles.

It has become highly desirable in the motor vehicle industry to provide booster brakes, particularly on passenger vehicles, wherein initial pedal movement to set the brakes takes place with a minimum amount of effort on the part of the operator. In other words, it is desirable to provide what is known in the industry as a "soft pedal." This has been accomplished in various ways in the past, usually with unsatisfactory results in other directions, either from the standpoint of economy in production or disadvantageous operation.

For example, numerous booster brake mechanisms, while highly efficient in operation, are rather expensive to manufacture because of the use of a manually operable plunger surrounded by a power operated sleeve, the two elements constituting a fluid displacing unit movable into the master cylinder. In such constructions, it likewise has been proposed to interpose a lost motion connection between the pedal operated rod and the manually operated fluid displacing plunger and to utilize movement of the manually operable rod to energize the motor without transmitting movement to the manually operated fluid displacing plunger, thus eliminating the necessity for the operator's having to displace fluid in initial movement of the brake pedal, which would provide a "hard pedal."

It is the common practice moreover in devices of this character to provide a follow-up valve mechanism whereby the pressure movable unit of the booster motor follows accurately the movement of the brake pedal and the elements mechanically connected thereto. However, it has been true in the past that whenever the valve is moved by the pedal past a lap position to energize the motor and is then stopped in its movement by arresting movement of the brake pedal, it is necessary for the piston of the motor to partake of additional movement before the valve elements reach the lap point, thus creating slight additional pressure in the master cylinder which reacts back through the manually operable elements of the construction to be felt in the brake pedal.

An important object of the present invention is to provide a novel type of booster brake mechanism which can be economically manufactured since it involves only a single fluid displacing plunger extending into the master cylinder, thus eliminating the expensive machining necessary in providing a power-operated sleeve and an inner manually operable plunger slidable therein.

A further object is to provide a construction wherein the positive connection between the pressure responsive unit of the motor and the hydraulic fluid displacing element which moves into the master cylinder has been eliminated in favor of a novel connection which permits a floating movement of the piston of the motor relative to the fluid displacing plunger to permit relative movements of the valve under the control of the operator, it being possible during a substantial portion of the operation of the device for the piston of the motor to lap or move to any other operative position relative to the valve controlled by the pedal, without transmitting movement to the hydraulic fluid displacing plunger.

A further object is to provide such a mechanism having a vacuum or other elastic fluid pressure motor having a pressure movable unit therein and a hydraulic fluid displacing plunger, and to connect these elements by a novel lever mechanism of simple balanced type whereby movements of the piston relative to the hydraulic plunger are possible to provide relative movements of the valve mechanism.

A further object is to provide a construction of the character just referred to wherein spring means is interposed between the pressure responsive unit of the motor and the hydraulic fluid displacing plunger so that movements of the motor piston are resiliently transmitted to the hydraulic plunger, and wherein a lever means is interposed between the pressure responsive unit of the motor and the manually operable element of the valve mechanism to provide a reaction back through the latter to provide an accurate hydraulic reaction to the movement of the pedal as distinguished from the disadvantageous vacuum reaction provided by many booster brake mechanisms.

Other objects and advantages of the invention will become apparent during the course of the following description.

In the drawings I have shown one embodiment of the invention. In this showing,

Figure 1 is a relatively large axial sectional view through the booster brake unit, portions of the apparatus at the ends thereof being broken away and parts being shown in elevation, Figure 2 is a transverse sectional view taken substantially on line 2—2 of Figure 1, Figure 3 is a fragmentary sectional view similar to Figure 1 showing the parts in substantially a fully brake-applied position, and, Figure 4 is a fragmentary face view of the floating plate carried by the hydraulic fluid displacing plunger.

Referring to Figure 1 the numeral 10 designates a booster motor as a whole comprising a cylinder 11 closed at one end as at 12 and provided at its open end with a head 13, preferably cast in the shape shown and providing an external pocket to receive an air cleaning element 14 to which air is supplied through a pipe 15 carried by a cover shell 16 for the air cleaner. The head 13 is fixed to the cylinder 11 as at 17 and is preferably sealed with respect thereto as at 18 to prevent any leakage of air into the motor except as the admission of such air is desirable.

The cylinder 11 is provided therein with a pressure movable unit indicated as a whole by the numeral 20 and dividing the motor into a vacuum chamber 21 and a variable pressure chamber 22, the former of which is adapted for constant communication with a source of vacuum through a suitable nipple 23 to which any desired type of tubing may be connected. The pressure movable unit is in the form of a piston comprising a pair of adjacent plates 25 and 26 between the peripheries of which is clamped a cup member 27 slidable against the inner wall surface of the cylinder 11. A cup expander of any desired type, 28, is arranged within the annular lip of the cup 27 and is retained in position by a suitable plate 29. The details of construction of the piston per se are not important to the present invention.

The plates 25 and 26 and retainer 29 are clamped between a pair of nut members 32 and 33, threaded on the inner end of a sleeve member 34. The inner end of this member receives a valve sleeve 35 having an annular space 36 in constant communication with the motor chamber 22 through a port 37. The valve sleeve 35 is provided in one end with a plurality of vacuum ports 38 and in its opposite end with a plurality of air ports 39.

Within this valve sleeve 35 is slidable a spool valve 42 having a recess in one end thereof receiving the adjacent end of a manually operable rod 43, the other end of which is connected in any suitable manner to the brake pedal to be actuated thereby. In the "off" position of the valve shown in Figure 1, the left hand end of the valve engages a resilient seat 44 to prevent leakage of air between the valve and valve sleeve, which would be highly disadvantageous when the parts are in the "off" position and the brake is not being operated. It is well known that some leakage necessarily occurs between cylindrical valves and sleeves, but this leakage is negligible and unimportant during the operation of the device.

The sleeve 34 is slidable in suitable sealing means generally indicated by the numeral 48 and the shell 16 is connected to one end of a boot 49 the other end of which is sealed with respect to the rod 43 to prevent the entrance of air into the interior of the sleeve 34, except by such air flowing through the air cleaner 14, inside the boot 49, and thence into the left hand end of the sleeve 34.

The right hand end of the valve 42 is reduced in size as shown in Figure 1 and is surrounded by a spring 52, one end of which bears against the valve 42 and the other end of which engages against a plate 53 having a central opening 53' in which is arranged a pilot stem 55 carried by the valve 42 to center the plate 53. This plate is of substantially cup shape as shown and is provided at its outer periphery with an annular flange 54 for a purpose to be described.

To the right of the cup-shaped plate 53 is a relatively large plate 56 stamped approximately 120° apart to provide pairs of ears 57, the ears of each pair being parallel to each other and spaced apart for the reception therebetween of a lever 58, one of these levers being shown in each of Figures 1, 3 and 4, and all three levers being shown in Figure 2. The radially inner end of each lever is provided with a finger 59 bearing against the flange 54 as clearly shown in Figures 1 and 3, such ends of the levers being shown in Figure 2 as overhanging the flange 54 for engagement therewith. The radially outer portion of each lever 58 is provided with a curved bulged portion 60 contacting with the plate 26 of the piston, as shown in Figures 1 and 3. A pivot pin 61 connects each lever to the associated pair of ears 57, and this pin may be located to provide each lever with the desired lever ratios in accordance with the reactions to be transmitted to the brake pedal as will become apparent below.

At preferably each of three points spaced 120° apart and equidistantly spaced between the levers 58 is a compression spring 65 (Figure 1) adapted to exert a resilient force between the plate 26 of the piston and the plate 56. Each spring 65 surrounds a sleeve 66 riveted to the plate 26 and extending through the plate 56 and secured by a screw 67 to a spring seat 68 against which seats one end of the relatively heavy return spring 69.

Referring to Figure 1 the numeral 72 designates a hydraulic fluid displacing plunger which may be solid as shown, there being no inner manually operable plunger therein. The radially inner portion of the plate 56 surrounds a reduced portion of this plunger together with a stiffening washer 73 and these elements are secured to the plunger by peening over the latter as at 74. The plunger 72 is provided in its left end with an axial recess 75 to provide ample space for the pilot end 55.

The closed end 12 of the motor carries a casting indicated as a whole by the numeral 80 and this casting carries a conventional master cylinder 81 or any other type of master cylinder through which fluid replenishing can take place.

The fluid replenishing feature is of no importance in connection with the present invention, but it will be understood that replenishing fluid is supplied from a suitable reservoir leading to an inlet connection 82. The casting 80 carries therewithin a bearing 83 for the plunger 72, and a cap member 84 threaded into the casting 80 is suitably sealed against leakage of fluid around the plunger 72 as at 84. In the master cylinder is arranged a return spring 85 operating against the left hand end of the plunger 72.

*Operation*

The various parts occupy the normal "off" positions shown in Figure 1. The reduced end of the valve 42 uncovers the ports 38 to the right hand end of the motor, namely, the vacuum chamber 21 which is always in communication with the source of vacuum. The annular space 36 is always in communication with the variable pressure motor chamber 22 through port 37. Accordingly the motor will be vacuum suspended and the left hand end of the valve 42 will be in engagement with the seal 44 to prevent any leakage of air into the variable pressure chamber 22.

Assuming that the brakes are to be applied, the operator will depress the brake pedal (not shown) to move the rod 43 toward the right. This operation moves the valve 42 in the same direction, unseating the left hand end of the valve from the sealing washer 44. Relatively slight movement of the valve 42 will cause it to close the vacuum openings 38, thus moving the valve to a lap position, and slight further movement will cause the left hand end of the valve 42 to uncover the ports 39, thus admitting air from the interior of the sleeve 34 through ports 39 and 37 into the variable pressure chamber 22 of the motor.

Differential pressures will immediately be established in the motor and the piston unit 20 will start to move to the right. The movement of the valve 42 will take place against resistance offered solely by the relatively light spring 52, and in energizing the motor, the pressure responsive unit 20 will deliver force to the fluid displacing plunger 72 by transmitting force through the springs 65 to the plate 56 which is secured to the plunger 72. Of course, some slight force will be delivered to the radially outer ends of the levers 58 to tend to move these levers in a clockwise direction and thus cause the inner fingers 59 of the levers to exert some force against the flange 54. The force thus exerted at this point will be relatively slight and will be absorbed by the spring 52 without transmitting positive force to the valve 42. The energization of the motor in the manner referred to will start movement of the plunger 72 toward the right to displace fluid from the master cylinder 81. Since the principal resistance to movement of fluid from the master cylinder will occur through the residual pressure valve, the pistons of the brake cylinders being relatively freely movable, the pressure responsive unit 20 of the motor does not encounter substantial resistance until actual braking pressures against the drums are required. Up to this point, there will be relatively little resistance to movement of the pedal, and accordingly the present construction provides a highly desirable "soft" pedal. During this stage of operation, as indicated above, a gap remains between the right hand end of the valve 42 and the plate 53.

As pressure builds up in the master cylinder incident to operation of the motor, such pressure reacts against the plunger 72, thus tending to retard its movement, and the gap between the plate 26 of the piston unit and the plate 56 secured to the plunger 72 tends to narrow. Ultimately, the gap between the right hand end of the valve 42 and the plate 53 will be taken up, and these elements will contact with each other and with the end of the plunger 72 as shown in Figure 3.

During the taking up of play between the end of the valve 42, the plate 53 and the adjacent end of the plunger 72, it will be apparent that the springs 65 will have been progressively compressed. This action, obviously therefore, takes place at a point determined in accordance with the tension of the springs 65 and can be designed to take place at any master cylinder pressure, for example from 80 to 90 p. s. i. The gap between the valve and the plunger 72 now being taken up, there are two forces transmitted to the hydraulic plunger 72, one being the manual force directly transmitted by the valve 42 through plate 53, and the other force being the motor force applied to the radially outer ends of the levers 58. In this connection it will be noted that with the plate 53 engaging the end of the valve, no further movement of this plate to the left can take place and it will "lock" the inner ends of the levers 58 and force applied against the lever portions 60 by the piston plate 26 will be transmitted through the pivot pins 61 to the plate 56 and thence to the plunger 72.

According to the relative lever lengths of the levers 58, the operator will then perform a predetermined proportionate share of the work in operating the plunger 72 and he will "feel" in the brake pedal a proportionate hydraulic reaction transmitted through the valve 42 by the plate 53 and levers 58. Prior to the taking up of the gap between the valve 42 and plate 53, most of the work will have been performed by the motor in transmitting force to the plunger 72 through springs 65.

An accurate piston modulating action is provided by interposing levers between the piston 20 and the plungers 72. It will be noted that the piston 20 as a unit is capable of movement wholly independently of the plunger 72 by virtue of the interposing of the levers 58 between the piston unit 20 and the plate 56 which is carried by the plunger. In the initial stages of brake pedal operation resistances are relatively light for the reason that the piston unit 20 is performing most of the work of initially displacing fluid from the master cylinder to move the brake shoes into engagement with the drums and for applying braking pressures up to the approximate pressure at which the gap is taken up between the valve 42 and the plate 53. Before the point is reached at which this gap is taken up, it will be apparent that when the valve 42 is in the motor energizing position uncovering the ports 39, movement of the rod 43 by the pedal may be arrested in which case the piston unit 20 will move slightly toward the right, carrying with it the valve sleeve 35 to restore the valve elements to lap position and this operation takes place without any movement of the plunger 72, there being merely a very slight and negligible rocking movement of the levers 58 during this relative movement of the piston unit 20. Therefore the lap position may be reached after motor energization without movement of the fluid displacing plunger 72 to displace additional fluid from the master cylinder. This not only provides for a soft pedal operation but for a highly accurate follow-up operation of the valve mechanism without any "lumpiness" or artificial resistance occurring through movement of the pressure responsive unit of the motor after movement of the pedal has been arrested. In this connection it will be noted that the motor unit, sleeve 34 and valve sleeve 35 all operate bodily as a unit under all conditions.

The construction is capable of flexibility in design in accordance with the desired reactions and other features of operation. For example, it will be possible to use in stock different plates 56 with levers 58 having slightly different lever lengths, and any such unit can be used in accordance with the desired reaction to be obtained, and this reaction is always accurately a hydraulic fluid reaction and not a vacuum or other elastic fluid reaction which does not provide as reliable an indication of brake application. Moreover, to vary the point at which play is taken up between the valve and the plate 53, it is easy to employ springs 65 of the desired tension, attention being invited to the fact that the play between the valve 42, plate 53 and plunger 72 is dependent upon the tensioning of the springs 65.

In Figure 3 of the drawings the valve and associated parts are shown as they will appear at or near the end of a brake operation in which play between the valve, the plate 53 and the plunger 72 is fully taken up, and it will be obvious in this view that the motor is under energization since the ports 39 are open to the atmosphere. Beyond the point at which the play referred to is taken up, there is a straight through application of manual force to the plunger 72 to supplement the power delivered to this plunger by the vacuum motor.

The manner in which the parts are returned to off position when the brake pedal is released will be obvious. Starting from the position shown in Figure 3 for example the operator may release the pedal and the spring 52 will immediately urge the valve 42 toward the left first to a lap position and then to a fully "off" position in which case the valve and its surrounding sleeve will assume the positions shown in Figure 1. No air then will be admitted into the variable pressure chamber 22 and the latter will again be connected to the constant vacuum chamber 21 to balance pressures on opposite sides of the piston 20. The return spring 69, assisted by pressure in the master cylinder and by the spring 85, will then return the rest of the parts to the normal positions. The returning of the piston plate 26 and the reaction plate 56 to their proper relative positions with respect to each other will be effected by the functioning of the center spring 52 and by the surrounding compression springs 65 as will be apparent.

It is pointed out that the construction shown in the drawings is intended to be illustrative only and the scope of the invention is defined in the appended claims.

I claim:

1. A booster brake mechanism comprising a master cylinder, a hydraulic fluid displacing unit including a plunger movable into said master cylinder, a fluid pressure operated motor having a pressure responsive unit therein, a manually operable unit comprising a valve occupying a normal position from which it is movable upon operation of said manually operable unit to energize said motor, a spring engaging said manually operable unit, and lever means connected to said fluid displacing unit and said pressure responsive unit and said spring to transmit to said pressure responsive and manually operable units pressure reaction forces on said fluid displacing unit occurring incident to the building up of hydraulic pressures in said master cylinder.

2. A booster brake mechanism in accordance with claim 1 provided with a movable plate coaxial with said manually operable unit, said spring being a compression spring interposed between said manually operable unit and said plate, said lever means being engageable with said plate, and said compression spring resiliently applying said reaction forces to said manually operable unit.

3. A booster brake mechanism comprising a fluid pressure operated motor having a casing and a pressure responsive unit therein, a master cylinder coaxial with said casing, a fluid displacing plunger operable in said master cylinder, a plate carried by said plunger, a manually operable rod, a follow-up control valve mechanism having a portion carried by said pressure responsive unit and a portion connected to said rod, said valve mechanism having a normal off position balancing pressures in said motor and being movable from such off position to establish differential pressures in said motor, and force transmitting means having a mechanical connection with said plate, said pressure responsive unit and said rod for transmitting to said pressure responsive unit and to said rod in a predetermined ratio pressure reaction forces against said plunger resulting from the generation of fluid pressures in said master cylinder, the connection of said force transmitting means with said rod including a spring, whereby said reaction forces will be resiliently transmitted to said rod.

4. A booster brake mechanism comprising a fluid pressure operated motor having a casing and a pressure responsive unit therein, a master cylinder coaxial with said casing, a fluid displacing plunger operable in said master cylinder, a plate carried by said plunger, a manually operable rod, a follow-up control valve mechanism having a portion carried by said pressure responsive unit and a portion connected to said rod, said valve mechanism having a normal off position balancing pressures in said motor and being movable from such off position to establish differential pressures in said motor, force transmitting means having a mechanical connection with said plate, said pressure responsive unit and said rod for transmitting to said pressure responsive unit and to said rod in a predetermined ratio pressure reaction forces against said plunger resulting from the generation of fluid pressures in said master cylinder, and spring means interposed between said plate and said pressure responsive unit whereby movement of the latter upon energization of said motor will transmit resilient forces through said plate to said plunger.

5. A booster brake mechanism comprising a fluid pressure operated motor having a casing and a pressure responsive unit therein, a master cylinder coaxial with said casing, a fluid displacing plunger operable in said master cylinder, a plate carried by said plunger, a manually operable rod, a follow-up control valve mechanism having a portion carried by said pressure responsive unit and a portion connected to said rod, said valve mechanism having a normal off position balancing pressures in said motor and being movable from such off position to establish differential pressures in said motor, force transmitting means having a mechanical connection with said plate, said pressure responsive unit and said rod for transmitting to said pressure responsive unit and to said rod in a predetermined ratio pressure reaction forces against said plunger resulting from the generation of fluid pressures in said master cylinder, and spring means interposed between said plate and said pressure responsive unit whereby movement of the latter upon energization of said motor will transmit resilient forces through said plate to said plunger independently of said force transmitting means, the connection between said force transmitting means and said rod including a spring, whereby said reaction forces will be transmitted resiliently to said rod.

6. A booster brake mechanism comprising a fluid pressure operated motor having a casing and a pressure responsive unit therein, a master cylinder coaxial with said casing, a fluid displacing plunger operable in said master cylinder, a plate carried by said plunger, a manually operable rod, a follow-up control valve mechanism having a portion carried by said pressure responsive unit and a portion connected to said rod, said valve mechanism having a normal off position balancing pressures in said motor and being movable from such off position to establish differential pressures in said motor, and a plurality of circumferentially spaced radial levers arranged between said pressure responsive unit and said plate and each having mechanical connection with said pressure responsive unit, said plate and said rod, whereby hydraulic reaction forces acting on said plunger in said master cylinder will be transmitted from said plate both to said pressure responsive unit and to said rod in a predetermined ratio to each, the connection between said levers and said rod including a compression spring whereby said reaction forces will be transmitted resiliently to said rod.

7. A booster brake mechanism comprising a fluid pressure operated motor having a casing and a pressure responsive unit therein, a master cylinder coaxial with said casing, a fluid displacing plunger operable in said master cylinder, a plate carried by said plunger, a manually operable rod, a follow-up control valve mechanism having a portion carried by said pressure responsive unit and a portion connected to said rod, said valve mechanism having a normal off position balancing pressures in said motor and being movable from such off position to establish differential pressures in said motor, a plurality of circumferentially spaced radial levers arranged between said pressure responsive unit and said plate and each having mechanical connection with said pressure responsive unit, said plate and said rod, whereby hydraulic reaction forces acting on said plunger in said master cylinder will be transmitted from said plate both to said pressure responsive unit and to said rod in a predetermined ratio to each, and circumferentially spaced compression springs interposed between said plate and said pressure responsive unit whereby a part of the force generated by said pressure responsive unit upon energization of said motor will be transmitted resiliently to said plate and thence to said plunger.

8. A mechanism according to claim 7 wherein the connection of said levers to said rod comprises a compression spring whereby reaction forces will be transmitted resiliently to said rod.

9. A booster brake mechanism comprising a fluid pressure operated motor having a casing and a pressure responsive unit therein, a master cylinder coaxial with said casing, a fluid displacing plunger operable in said master cylinder, a plate carried by said plunger, a manually operable rod, a follow-up control valve mechanism having a portion carried by said pressure responsive unit and a portion connected to said rod, said valve mechanism having a normal off position balancing pressures in said motor and being movable from such off position to establish differential pressures in said motor, a plurality of circumferentially spaced radial levers interposed between said plate and said pressure responsive unit, means for fulcruming each lever intermediate its ends on said plate, each lever having its radially outer end engaging said pressure responsive unit, and mechanical connections between the inner end of each lever and said rod.

10. A booster brake mechanism in accordance with claim 9 wherein the connections between the inner ends of said levers and said rod comprises a compression spring.

11. A booster brake mechanism in accordance with claim 9 provided with a plurality of circumferentially spaced springs between said levers each acting at its ends against said pressure responsive unit and said plate to urge the latter away from said pressure responsive unit and to resiliently transmit force from the latter to said plate upon energization of said motor.

12. A booster brake mechanism in accordance with claim 9 provided with a plurality of circumferentially spaced springs between said levers each acting at its ends against said pressure responsive unit and said plate to urge the latter away from said pressure responsive unit and to resiliently transmit force from the latter to said plate upon energization of said motor, the connections between the inner ends of said levers and said rod comprising a single compression spring co-axial with said rod.

13. A booster brake mechanism comprising a fluid pressure operated motor having a casing and a pressure responsive unit therein, a master cylinder coaxial with said casing, a fluid displacing plunger operable in said master cylinder, a plate carried by said plunger, a manually operable rod, a follow-up control valve mechanism having a portion carried by said pressure responsive unit and a portion connected to said rod, said valve mechanism having a normal off position balancing pressures in said motor and being movable from such off position to establish differential pressures in said motor, a plurality of circumferentially spaced radial levers interposed between said pressure responsive unit and said plate, a pivot pin for connecting each lever intermediate its ends to said plate, the outer end of each lever engaging said pressure responsive unit, a second plate coaxial with said rod and having a peripheral radially outwardly extending flange engaging the inner ends of said levers, and means for delivering to said rod forces transmitted to said second plate by the inner ends of said levers.

14. A booster brake mechanism in accordance with claim 13 wherein said means for delivering forces to said rod comprises a single compression spring coaxial with said rod, said spring having mechanical connection at one end with said rod and at its other end with said second plate.

15. A booster brake mechanism in accordance with claim 13 provided with a plurality of circumferentially spaced coiled compression springs arranged between said levers, and means for supporting said coiled springs, said springs engaging at one end with said pressure responsive unit and at the other end against said first named plate to urge the latter away from said pressure responsive unit.

16. A booster brake mechanism comprising a master cylinder, a hydraulic fluid displacing unit including a single solid plunger movable into said master cylinder and constituting the sole means for displacing fluid therefrom, a fluid pressure operated motor having a pressure responsive unit therein mounted for movement relative to said plunger, a manually operable unit having lost motion connection with said plunger comprising an operator operated push rod and a valve operated thereby coaxial with said plunger and occupying a normal position from which it is movable to energize said motor, spring means between said valve and said plunger, and force transmitting means between said pressure responsive unit and said fluid displacing unit and said spring means to transmit to said pressure responsive unit and, through said spring means, to said valve and said push rod hydraulic reaction forces in said master cylinder acting on said plunger.

References Cited in the file of this patent
UNITED STATES PATENTS

| | | |
|---|---|---|
| 1,620,513 | Bragg | Mar. 8, 1927 |
| 1,781,868 | Bragg et al. | Nov. 18, 1930 |
| 1,846,023 | Bragg et al. | Feb. 23, 1932 |
| 2,006,487 | Sorensen | July 2, 1935 |
| 2,207,700 | Porter | July 16, 1940 |
| 2,260,491 | Stelzer | Oct. 28, 1941 |
| 2,318,756 | Chouings | May 11, 1943 |
| 2,360,578 | Porter | Oct. 17, 1944 |
| 2,457,721 | Price | Dec. 28, 1948 |
| 2,458,803 | Stelzer | Jan. 11, 1949 |
| 2,532,960 | Stelzer | Dec. 5, 1950 |
| 2,646,665 | Rockwell | July 28, 1953 |